United States Patent
Li et al.

(10) Patent No.: US 10,805,954 B2
(45) Date of Patent: Oct. 13, 2020

(54) MULTI-GRANT FOR LISTEN-BEFORE-TALK BASED UPLINK TRANSMISSION ATTEMPTS

(71) Applicant: Telefonaktiebolaget LM Ericsson (publ), Stockholm (SE)

(72) Inventors: Gen Li, Beijing (CN); Laetitia Falconetti, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/311,916

(22) PCT Filed: Apr. 26, 2017

(86) PCT No.: PCT/EP2017/059916
§ 371 (c)(1),
(2) Date: Dec. 20, 2018

(87) PCT Pub. No.: WO2017/220237
PCT Pub. Date: Dec. 28, 2017

(65) Prior Publication Data
US 2019/0182866 A1   Jun. 13, 2019

(30) Foreign Application Priority Data
Jun. 22, 2016   (WO) ................ PCT/CN2016/086676

(51) Int. Cl.
*H04W 74/08*     (2009.01)
*H04W 72/12*     (2009.01)
(Continued)

(52) U.S. Cl.
CPC ..... *H04W 74/0808* (2013.01); *H04W 72/121* (2013.01); *H04W 74/006* (2013.01); *H04W 74/02* (2013.01)

(58) Field of Classification Search
CPC .......... H04W 74/0808; H04W 72/121; H04W 74/006
See application file for complete search history.

(56) References Cited

U.S. PATENT DOCUMENTS

2003/0021286 A1 * 1/2003 Boscovic ................ H04L 12/28
2013/0301551 A1 * 11/2013 Ghosh ................ H04W 72/042
(Continued)

FOREIGN PATENT DOCUMENTS

| CN | 105656607 A | 6/2016 |
|---|---|---|
| CN | 105682101 A | 6/2016 |
| WO | 2016022062 A1 | 2/2016 |

OTHER PUBLICATIONS

3GPP, "3rd Generation Partnership Project; Technical Specification Group Radio Access Network; Study on Licensed-Assisted Access to Unlicensed Spectrum; (Release 13)", 3GPP TR 36.889 V13.0.0, Jun. 2015, 1-87.
(Continued)

*Primary Examiner* — Ronald B Abelson
(74) *Attorney, Agent, or Firm* — Murphy, Bilak & Homiller, PLLC

(57) ABSTRACT

An access node (100) of a wireless communication network controls radio transmissions on a set of radio resources. The access node (100) determines a group of multiple radio devices (11, 12, 13) and grants an uplink transmission attempt on the set of radio resources to each radio device (11, 12, 13) of the group. The uplink transmission attempt is based on a listen-before-talk procedure. The listen-before-talk procedure involves that the radio device (11, 12, 10 13) performs measurements to detect whether the set of radio resources is available and that, in response to detecting that the set of radio resources is available, the radio device (11, 12, 13) performs a radio transmission to the access node on the set of radio resources.

10 Claims, 13 Drawing Sheets

(51) Int. Cl.
*H04W 74/00* (2009.01)
*H04W 74/02* (2009.01)

(56) References Cited

U.S. PATENT DOCUMENTS

2015/0071060 A1   3/2015  Bhushan et al.
2017/0265225 A1*  9/2017  Takeda .................. H04W 74/08

OTHER PUBLICATIONS

Unknown, Author, "Analysis of LBT Operation for LAA Uplink", 3GPP TSG-RAN WG2 Meeting #90, R2-152219, Fukuoka, Japan, May 25-29, 2015, 1-6.
Unknown, Author, "UL channel access for eLAA", 3GPP TSG-RAN WG1 Meeting #84bis, R1-162913, Busan, Korea, Apr. 11-15, 2016, 1-4.
Unknown, Author, "UL LBT and DL/UL Frame Structure for LAA", 3GPP TSG RAN WG1 Meeting #82, R1-154574, Beijing, China, Aug. 25-28, 2015, 1-6.
Unknown, Author, "Uplink Channel Access Mechanisms in eLAA", 3GPP TSG RAN WG1 meeting #85, R1-165235, Nanjing, China, May 23-27, 2016, 1-4.
Unknown, Author, "Uplink transmission with LBT", 3GPP TSG-RAN WG2 #89bis, R2-151102, Bratislava, Slovakia, Apr. 20-24, 2015, 1-6.

* cited by examiner

MULTI-GRANT FOR LISTEN-BEFORE-TALK BASED UPLINK TRANSMISSION ATTEMPTS

TECHNICAL FIELD

The present invention relates to methods for controlling radio transmissions and to corresponding devices and systems.

BACKGROUND

A massive growth in mobile broadband data traffic has driven evolution of the cellular networks and other wireless communication networks to meet the tremendous need for increased capacity. However, the traffic growth will be difficult to address with spectrum currently available for cellular systems, especially for the valuable bands with low propagation loss below 6 GHz. Traditionally, cellular networks operate on the basis of licensed frequency bands, i.e., frequency bands which are exclusively licensed to a certain operator.

A licensed frequency band offers benefits from a quality and availability perspective. On the other hand, licensed frequency bands are scarce and expensive, especially below 6 GHz. In view of this situation, it is also considered to utilize unlicensed frequency bands, i.e., frequency bands which are not dedicated to a certain operator or technology, for operating a cellular network.

For example, in the case of the LTE (Long Term Evolution) technology as specified by 3GPP ($3^{rd}$ Generation Partnership Project), a scenario referred to as "licensed-assisted access" (LAA) with carrier aggregation (CA) between licensed band and unlicensed band is discussed in 3GPP TR 36.889 V13.0.0 (2015-06). In this case, which in the following will be referred to as "LAA LTE", a licensed LTE carrier is used for control signaling and parts of the user data, while one or more carriers in unlicensed spectrum are used to boost performance for transmission of user plane data in the downlink (DL) direction from network to UE (user equipment) and optionally also in the uplink (UL) direction from the UE to the network. In each case, an important aspect is to manage coexistence with other operators and/or technologies, such as WLAN (Wireless Local Area Network).

In the LTE technology, a UL transmission of data by a UE typically involves two steps: In a first step, a base station, in the LTE technology referred to as eNB (evolved Node B) sends a UL grant to the UE. The UL grant indicates radio resources to be used by the UE to transmit the data. The UL grant allocates the radio resources exclusively to the UE. In a second step, the UE transmits the data in the radio resources indicates by the UL grant and the eNB decodes the data from signals received on these radio resources.

In the case of CA based LAA, either cross carrier scheduling or self-scheduling could be used for sending the UL grant to the UE. In the case of cross-carrier scheduling, the UL grant would be transmitted in the licensed frequency band and indicate radio resources in the unlicensed frequency band. In the case of self-scheduling, the UL grant would be transmitted in the unlicensed frequency band and indicate radio resources in the unlicensed frequency band.

Further, 3GPP TR 36.889 V13.0.0 recommends that the UE performs a listen-before-talk (LBT) procedure before performing a UL radio transmission, which means that the UL transmission would depend on success of the LBT procedure performed by the UE. For example, if the LBT procedure reveals that the radio resources indicated by the UL grant are already in use, the scheduled UL transmission would be cancelled (and typically attempted again at a later time).

It was observed that in a scenario where LAA LTE coexists with a WLAN technology in an unlicensed frequency band, there is a high ratio of cancelled UL transmissions, especially under high traffic load. This may be attributed to unfair sharing of the radio resources by the LAA LTE technology on the one hand and the WLAN technology on the other hand. In the case of the LAA LTE technology, only one LAA LTE UE (per operator) receives an UL grant for a certain set of radio resources and can contend for these radio resources. In the case of the WLAN technology, all radio devices in the neighborhood of this LAA LTE UE can contend for these radio resources, which means that there is a significantly higher chance that a WLAN radio device will gain access to the radio resources and then block the LAA LTE UE from gaining access to the radio resources.

Accordingly, there is a need for techniques which allow for efficient control of scheduled radio transmissions on shared radio resources.

SUMMARY

According to an embodiment of the invention, a method of controlling radio transmission in a wireless communication network is provided. According to the method, an access node of the wireless communication network controls radio transmissions on a set of radio resources. The access node determines a group of multiple radio devices and grants an uplink transmission attempt on the set of radio resources to each radio device of the group. The uplink transmission attempt is based on an LBT procedure. The LBT procedure comprises that the radio device performs measurements to detect whether the set of radio resources is available and that, in response to detecting that the set of radio resources is available, the radio device performs a radio transmission to the access node on the set of radio resources.

According to a further embodiment of the invention, a method of controlling radio transmission in a wireless communication network is provided. According to the method, a radio device from a group of multiple radio devices receives, from an access node of the wireless communication network, a grant for an uplink transmission attempt on a set of radio resources and configuration information for the uplink transmission attempt. The radio device performs the uplink transmission attempt based on an LBT procedure. The LBT procedure comprises that, over a backoff time configured by the received configuration information, the radio device performs measurements on the set of radio resources. Further, the LBT procedure comprises that, on the basis of the measurements, the radio device detects that the set of radio resources is available, and upon expiry of the backoff time, performs a radio transmission to the access node on the set of radio resources. The backoff time configured by the received configuration information differs from a backoff time configured to be applied by the other radio devices of the group.

According to a further embodiment of the invention, an access node for a wireless communication network is provided. The access node is configured to control radio transmissions on a set of radio resources. Further, the access node is configured to determine a group of multiple radio devices and grant an uplink transmission attempt on the set of radio resources to each radio device of the group. The uplink transmission attempt is based on an LBT procedure. The LBT procedure comprises that the radio device performs measurements to detect whether the set of radio resources is available and that the radio device performs the radio transmission in response to detecting that the set of radio resources is available.

According to a further embodiment of the invention, a radio device is provided. The radio device is configured to receive, from an access node of a wireless communication network and together with other radio devices of a group, a grant for an uplink transmission attempt on a set of radio resources and configuration information for the uplink transmission attempt. Further, the radio device is configured to perform the uplink transmission attempt based on an LBT procedure. The LBT procedure comprises that, over a backoff time configured by the received configuration information, the radio device performs measurements on the set of radio resources. Further, the LBT procedure comprises that, on the basis of the measurements, the radio device detects that the set of radio resources is available, and upon expiry of the backoff time, performs a radio transmission to the access node on the set of radio resources. The backoff time configured by the received configuration information differs from a backoff time configured to be applied by the other radio devices of the group.

According to a further embodiment of the invention, a system is provided. The system comprises an access node and a plurality of radio devices. The access node is configured to control radio transmissions on a set of radio resources. Further, the access node is configured to determine a group of multiple radio devices from the plurality of radio devices and grant an uplink transmission attempt on the set of radio resources to each radio device of the group. Each of the radio devices is configured to perform the uplink transmission attempt based on an LBT procedure. The LBT procedure comprises that the radio device performs measurements to detect whether the set of radio resources is available, and that the radio device performs a radio transmission on at least a part of the set of detected radio resources in response to detecting that the set of radio resources is available.

According to a further embodiment of the invention, a computer program or computer program product is provided, e.g., in the form of a non-transitory storage medium, which comprises program code to be executed by at least one processor of an access node of a wireless communication network. Execution of the program code causes the access node to control radio transmissions on a set of radio resources. Further, execution of the program code causes the access node to determine a group of multiple radio devices and grant an uplink transmission attempt on the set of radio resources to each radio device of the group. The uplink transmission attempt is based on an LBT procedure. The LBT procedure comprises that the radio device performs measurements to detect whether the set of radio resources is available and that the radio device performs the radio transmission in response to detecting that the set of radio resources is available.

According to a further embodiment of the invention, a computer program or computer program product is provided, e.g., in the form of a non-transitory storage medium, which comprises program code to be executed by at least one processor of a radio device. Execution of the program code causes the radio device to receive, from an access node of a wireless communication network and together with other radio devices of a group, a grant for an uplink transmission attempt on a set of radio resources and con-figuration information for the uplink transmission attempt. Further, execution of the program code causes the radio device to perform the uplink transmission attempt based on an LBT procedure. The LBT procedure comprises that, over a backoff time configured by the received configuration information, the radio device performs measurements on the set of radio resources. Further, the LBT procedure comprises that, on the basis of the measurements, the radio device detects that the set of radio resources is available, and upon expiry of the backoff time, performs a radio transmission to the access node on the set of radio resources. The backoff time configured by the received configuration information differs from a backoff time configured to be applied by the other radio devices of the group.

Details of such embodiments and further embodiments will be apparent from the following detailed description of embodiments.

DETAILED DESCRIPTION OF EMBODIMENTS

Figure 1:
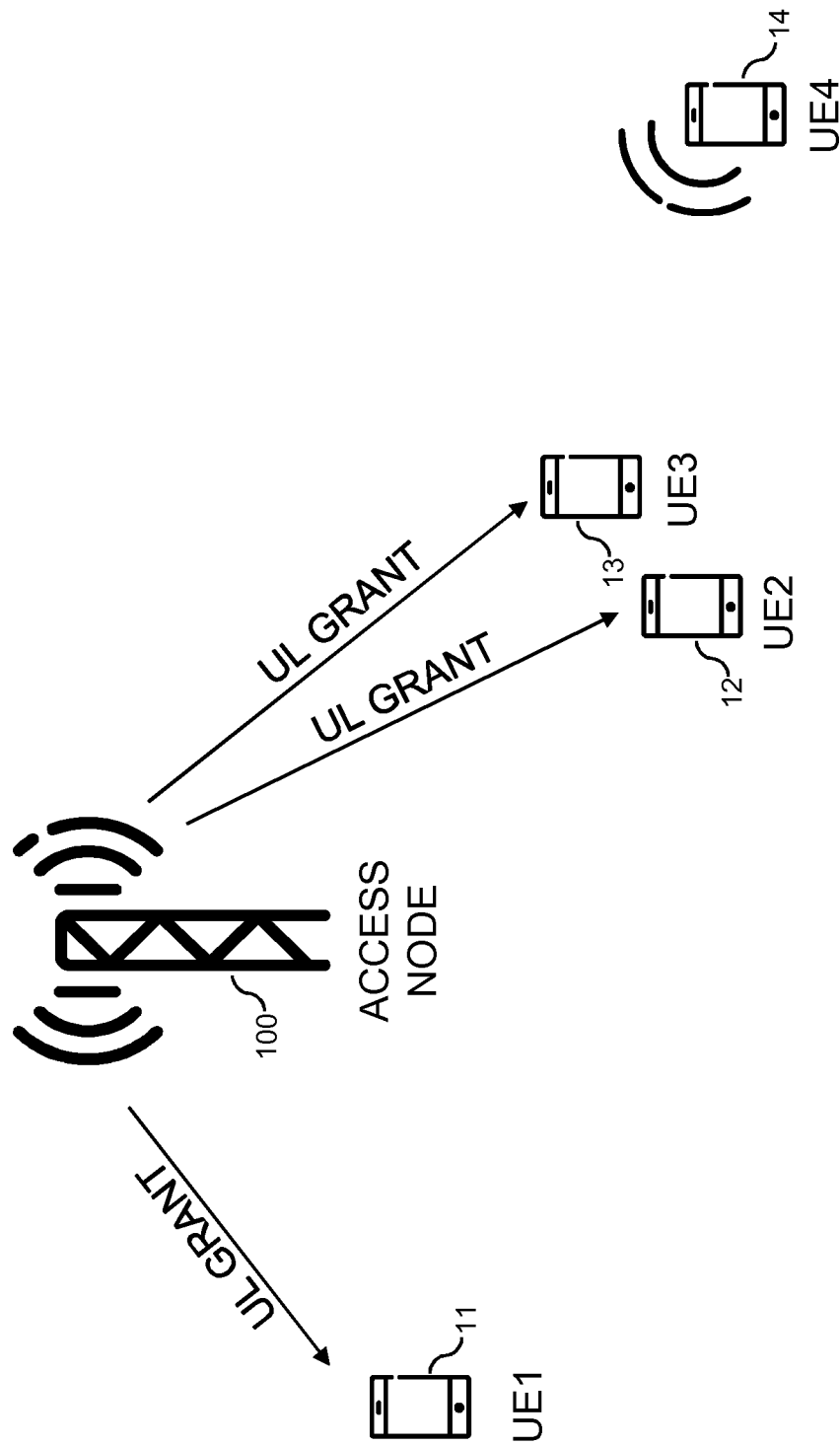
FIG. 1 schematically illustrates a scenario in which radio transmissions are controlled according to an embodiment of the invention.

In the following, concepts in accordance with exemplary embodiments of the invention will be explained in more detail and with reference to the accompanying drawings. The illustrated embodiments relate to control of radio transmissions in a wireless communication network. In the illustrated examples, it is assumed that the wireless communication network is based on the LTE technology and further supports LAA based utilization of unlicensed frequency bands. However, it is noted that the illustrated concepts may also be applied to other technologies, e.g., a next generation wireless communication technology.

In the illustrated concepts, it is assumed that radio transmissions in the wireless communication network are scheduled from the network side, which specifically includes that UL transmissions from a radio device (in the following also referred to as UE) to the network are performed in response to the network granting the UL transmission and also allocating radio resources to be used for the UL transmission. In this way, the network can efficiently manage sharing of radio resources by multiple UEs. In view of coexistence with radio devices controlled by other operators and/or using other radio technologies in an unlicensed frequency band, the UL transmissions are further performed on the basis of an LBT procedure. That is to say, before the UE performs an UL transmission granted by the network, it will perform measurements on the allocated radio resources to determine whether the radio resources are available. This may involve sensing whether there is an ongoing transmission on the radio resources which could interfere with the granted UL transmission. If there is no ongoing radio transmission on the radio resources or if the observed signal strengths of a detected ongoing radio transmission are sufficiently low, e.g., below a threshold, the radio resourced are deemed to be available and the UE proceeds by performing the UL transmission on the allocated radio resources. This scenario will in the following also be referred to as success of the LBT procedure. Otherwise, the UE will defer the UL transmission. The UE may then attempt to perform the UL transmission at a later time.

In order to improve the chances that the LBT procedure is successful, granting the UL transmission by the UE involves that the network, in particular an access node of the network, grants a UL transmission attempt on the same radio resources of the unlicensed frequency band to multiple UEs. In response thereto, the multiple UEs will each perform the LBT procedure and to contend for gaining access to the radio resources. Since the measurements performed by the UEs in the LBT procedure may provide different results for each of the UEs, e.g., due to different locations and radio conditions UEs of the UEs, the chances that the LBT procedure is successful for one of the UEs are improved. For example, while for one of the UEs the LBT procedure may be unsuccessful because the UE detects an ongoing radio transmission on the allocated radio resources, this ongoing radio transmission might not be detected by another one of the UEs which is located at a different position. Accordingly, the latter UE could proceed to perform the UL transmission on the allocated radio resources. From the network perspective, the chances of a successful LBT procedure are thus improved. The granting of the UL transmission attempt to the multiple UEs may be accomplished in a similar manner as the granting of a UL transmission in the LTE technology, e.g., by sending a UL grant. However, rather than sending the UL ground to only one UE, the UL grant would be sent to the multiple UEs. This can be accomplished using unicast mechanisms, e.g., by utilizing a downlink control channel individually configured for each of the UEs, or by utilizing a multicast transmission addressed to multiple UEs. In the following, the UL grant used to grant the UL transmission attempt to the multiple UEs will also be referred to as "UL multi-grant".

In some scenarios, the network may further increase the chances of the LBT procedure of being successful by managing the group of UEs to which the UL transmission attempt is granted. In particular, UEs for which it is likely that the LBT procedure will have different outcomes may be grouped together to provide diversity. For example, this grouping could depend on locations of the UEs and/or on radio measurements performed by the UEs: If two UEs are located far from each other or the radio signal strengths measured between two UEs are low, there is an increased likelihood that the LBT procedure will provide different outcomes because these UEs may detect different ongoing radio transmissions in their neighborhood and/or detect the same ongoing radio transmission with different signal strength. Accordingly, it may be beneficial to group these two UEs together. Further, the grouping could depend on beamforming configurations of the UEs: If two UEs use beamforming configurations focusing on different areas, there is an increased likelihood that the LBT procedure will provide different outcomes because these UEs may detect different ongoing radio transmissions and/or detect the same ongoing radio transmission with different signal strength. Accordingly, it may be beneficial to group these two UEs together.

In some scenarios, there is also a possibility that the LBT procedure is successful for more than one of the UEs to which the UL transmission attempt was granted. To address such scenarios, the network may also implement measures to avoid conflicting UL radio transmissions by these UEs. This may for example be achieved by configuring the UEs to apply different back of times in the LBT procedure and/or by configuring the UE is to send an indication before proceeding to perform the UL radio transmission. In response to receiving this indication, other UEs may refrain from performing the UL radio transmission even if the LBT procedure was successful, so that conflicting radio transmissions can be avoided. For example, the UE for which the LBT procedure was successful may first send an RTS (Ready to Send) indication, and in response to this RTS indication the network may send an CTS (Clear to Send) indication. Upon receiving the RTS indication or the CTS indication, other UEs for which the LBT procedure was successful may refrain from performing their UL radio transmission.

FIG. 1 schematically illustrates a scenario in which radio transmissions are controlled in accordance with the concept as outlined above. Specifically, FIG. 1 shows a number of UEs 11, 12, 13 and an access node 100 which controls radio communication by the UEs 11, 12, 13. This radio communication is assumed to be based on LAA LTE in an unlicensed frequency band. Further, FIG. 1 shows a further radio device 14 which coexists with the UEs 11, 12, 13 in the unlicensed frequency band. For example, this further radio device could be a UE associated with another operator's network and/or or a UE using another radio technology, e.g., a WLAN technology.

In accordance with the assumed utilization of the LTE technology, the access node 100 may also be referred to as eNB. The control functionalities of the access node 100 specifically include scheduling of radio transmissions by the UEs 11, 12, 13. This may be accomplished by assigning radio resources to the UEs 11, 12, 13. For this purpose, the radio resources are organized in a time-frequency grid. In the LTE technology this time frequency grid defines a time domain structure which is based on subframes of 1 ms duration, which in turn include multiple OFDM (Orthogonal Frequency Division Multiplexing) symbols (typically 14 OFDM symbols). Further, a subframe is divided into a first slot and a second slot (each having a length of typically seven OFDM symbols). In the frequency domain, the time frequency grid defines multiple subcarriers. Within a certain subframe, one resource element (RE) of the time frequency grid is thus defined by its OFDM symbol position and its subcarrier position. The granularity in which the REs can be assigned in the scheduling process is defined by resource blocks (RBs) extending over 12 subcarriers in the frequency domain and one slot in the time domain.

The scheduling of UL transmissions by the access node 100 involves sending UL grants to the UEs 11, 12, 13. The UL grants indicate a set of radio resources to be used for the UL radio transmission by the UE 11, 12, 13. In the unlicensed frequency band, the UE 11, 12, 13 performs the UL transmission on the basis of an LBT procedure. That is to say, before transmitting on the set of radio resources indicated by the UL grant, the UE 11, 12, 13 will perform measurements on the set of radio resources to assess whether the set of radio resources is available and perform a UL radio transmission only if the set of radio resources is found to be not available. For example, the radio device 14 may have an ongoing radio transmission on the set of radio resources, and the UE 11, 12, 13 may thus find that the set of radio resources is not available. Accordingly, by the LBT procedure, the UEs 11, 12, 13 contend with the radio device 14 for the radio resources of the unlicensed frequency band.

As explained above, in order to increase the chances of success of the LBT procedure performed by the UEs 11, 12, 13, the access node 100 may utilize the above-mentioned UL multi-grant. That is to say, if multiple UEs have UL data to transmit, the access node 100 assigns a set of radio resources from the unlicensed frequency band to a group including at least some of these multiple UEs and indicates this by sending an UL multi-grant to the group of UEs.

In the exemplary scenario of FIG. 1, the UL multi-grant is sent to the UEs 11, 12, and 13. As can be seen, the UE 12 is much closer to the radio device 14 than the UE 11. Accordingly, while the UE 12 may detect an ongoing radio transmission of the radio device 14, this might not be the case for the UE 11. Accordingly, while the LBT procedure triggered by the UL multi-grant would be unsuccessful for the UE 12, it would succeed for the UE 11. Due to the large distance between the UE 11 and the radio device 14, the UL radio transmission would not interfere with the ongoing radio transmission of the radio device 14. Similar considerations may also apply with respect to different radio conditions or beamforming configurations of the UEs 11, 12, 13. For example, while the UE 13 is shown as being located closer to the radio device 14 than the UE 12, the UE 13 could use a beamforming configuration defining a narrow beam directed towards the access node 100, while the UE 12 could use a more omnidirectional beamforming configuration (or no beamforming at all). Accordingly, during the LBT procedure the UE 12 could detect the ongoing radio transmission by the radio device 14, while this ongoing radio transmission by the radio device 14 might not be detected by the UE 13. Accordingly, while the LBT procedure triggered by the UL multi-grant would be unsuccessful for the UE 12, it would succeed for the UE 13. Similarly, there could be an obstacle between the UE 13 and the radio device 14, with the effect that radio signals from the radio device 14 are at least partly blocked from being received by the UE 13, but not by the UE 12. Accordingly, during the LBT procedure the UE 12 could detect the ongoing radio transmission by the radio device 14, while this ongoing radio transmission by the radio device 14 might not be detected by the UE 13. Again, while the LBT procedure triggered by the UL multi-grant would be unsuccessful for the UE 12, it would succeed for the UE 13.

As can be seen, by using the UL multi-grant the chances of the UEs 11, 12, 13 successfully contending for the radio resources are improved.

In some scenarios, the access node 100 may send the UL multi-Grant to all UEs in its coverage area which have UL data to transmit. In other scenarios, the access node 100 may determine the group of UEs with the aim of optimizing the chances of a successful LBT procedure.

For example, the access node 100 may determine the group of UEs to which the UL multi-grant is sent depending on their locations, in particular based on the mutual distances between the UEs. For example, in the scenario in FIG. 1, the UE 11 and the UE 12 are located far from each other and thus likely to measure different results in the LBT procedure, while the UE 12 and the UE 13 are located close to each other and thus likely to measure similar results in the LBT procedure. Accordingly, it may be beneficial to group the UE 11 and the UE 12 or to group the UE 11 and the UE 13. A corresponding determination of the group of UEs to which the UL multi-grant is transmitted can thus be based on information about the position of UEs 11, 12, 13. For this purpose, UE positioning functionalities supported by the wireless communication network may be utilized, e.g., positioning functionalities based on measurements performed by UEs and/or access nodes, e.g., as specified for the LTE technology.

Figure 2:
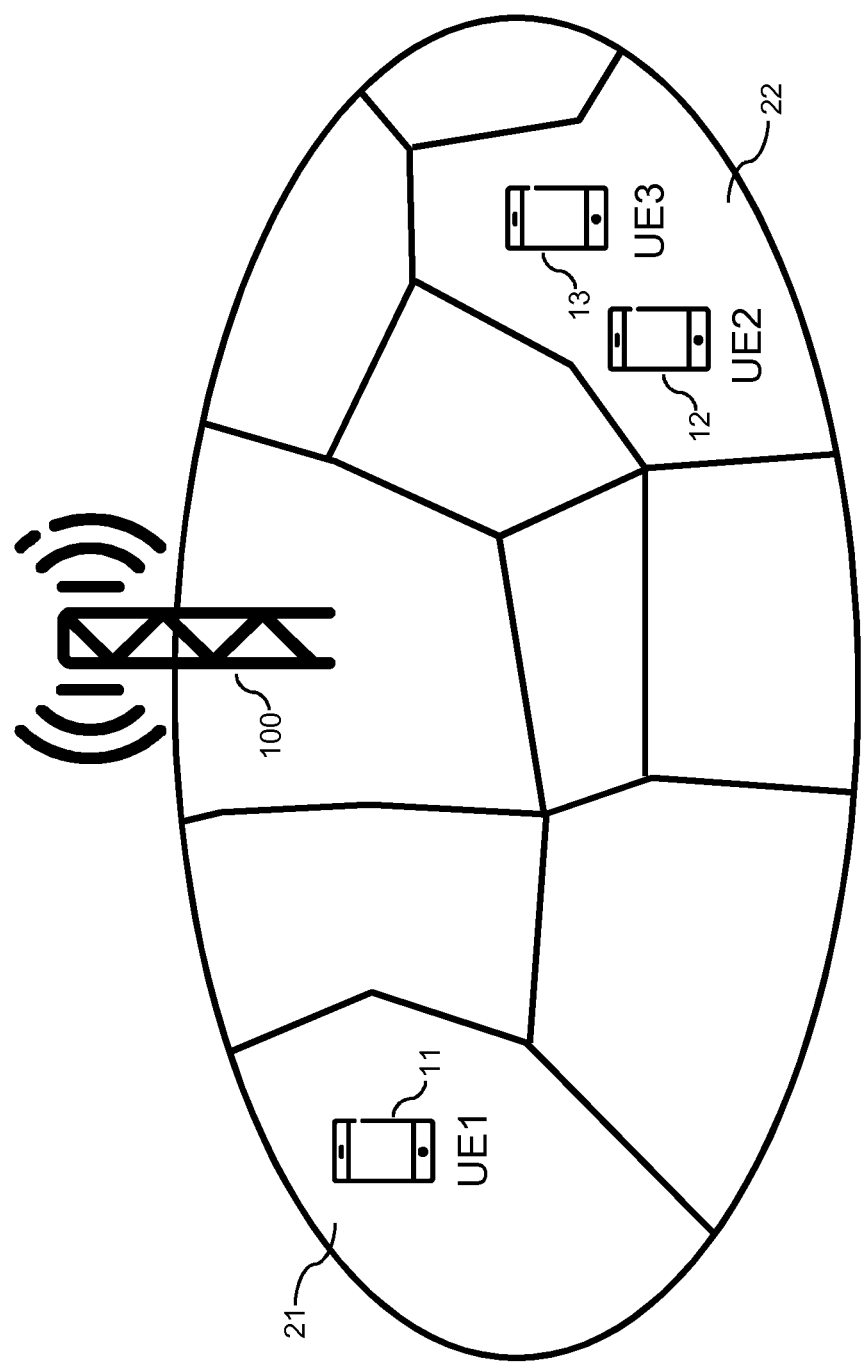
FIG. 2 schematically illustrates location-based grouping of radio devices as used in an embodiment of the invention.

Typically, the positioning information does not need to be very accurate. For example, the positioning information could be obtained in terms of regions within a coverage area of the access node 100, as for example illustrated in FIG. 2. As shown in FIG. 2, a coverage area of the access node 100 is subdivided into multiple regions. The UE 11 is located in a first region 21, and the UEs 12 and 13 are located in a second region 22. Accordingly, a rule for determining the group of UEs 11, 12, 13 to which the UL multi-grant is sent could be to assign UEs 11, 12, 13 to the group which are from different regions or to assign UEs 11, 12, 13 to the group which are from non-neighboring regions. However, it is noted that it is of course also possible to consider the locations of the UEs 11, 12, 13 in more detail manner, e.g., by measuring mutual distances between the UEs 11, 12, 13 and basing the grouping on these measured mutual distances. In this case, a corresponding rule for determining the group of UEs 11, 12, 13 to which the multi-grant is sent could be to assign UEs 11, 12, 13 to the group for which the mutual distance is above a threshold.

In addition or as an alternative, the grouping of the UEs 11, 12, 13 can also be based on measurements of received signal strength (RSS) between the UEs. For example, if the measurements of RSS between two UEs 11, 12, 13 result in a low RSS, e.g., an RSS below a threshold, these two UEs 11, 12, 13 can be grouped together. The measurement of RSS between two UEs 11, 12, 13 may be based on knowledge of a path gain between these two UEs 11, 12, 13 and/or the transmit power of the transmitting UE 11, 12, 13. The path gain between the UEs 11, 12, 13 can be estimated using a function modeling the attenuation between UEs 11, 12, 13 depending on the distance. The distance between the UEs 11, 12, 13 can be obtained from their position. An estimate of the transmit power may be obtained from other information available at the access node 100, e.g., based on a power class of the transmitting UE 11, 12, 13 and/or a power headroom report from the transmitting UE 11, 12, 13.

In addition or as an alternative, RSS measurements between the UEs 11, 12, 13 and the access node 100 can be used as a basis for determining the group of UEs 11, 12, 13 to which the multi-grant is sent. For example, a UE 11, 12, 13 for which the RSS with respect to the access node 100 is high, e.g., above an upper threshold, can be grouped with a UE 11, 12, 13 for which the RSS with respect to the access node 100 is low, e.g., below a lower threshold.

In addition or as an alternative, the group of the UEs 11, 12, 13 to which the UL multi-grant is sent may be determined on the basis of total power measurements which also consider interference. An example of such total power measurement is the measurement of an RSSI (Received Signal Strength Indicator) as specified in the LTE technology. In this case, for example, a UE 11, 12, 13 for which the measured total power is high, e.g., above a an upper threshold, can be grouped with a UE 11, 12, 13 for which the measured total power is low, e.g., below a lower threshold. The different measured total powers indicate that these UEs experience different interference situation which means that the LBT procedures of these UEs are likely to have a different outcome. The utilization of RSS or power measurements may allow for also considering shadowing effects for different antenna configurations of the UEs in the grouping.

In addition or as an alternative, information about beamforming configurations applied by the UEs 11, 12, 13 may be used as a basis for determining the group of UEs 11, 12, 13 to which the UL multi-grant is sent. For example, this information about the beamforming configurations may include beamforming vectors. If the same beamforming vector is used for two of the UEs 11, 12, 13, they are likely located in the same direction from the access node 100. Accordingly, an example of a grouping rule based on information about beamforming configurations could be to group UEs 11, 12, 13 having different beamforming vectors.

In addition or as an alternative, information about WLAN access points detected by the UEs 11, 12, 13 may be used as a basis for determining the group of UEs 11, 12, 13 to which the UL multi-grant is sent. For example, if the UEs 11, 12, 13 are equipped with a WLAN receiver and are able to decode WLAN signals, they could detect the WLAN Service Set Identifier (SSID) of neighboring WLAN access points. The UEs 11, 12, 13 can then report a list of detected WLAN access points to the access node 100. This list can be reduced to contain only WLAN access points whose signals are received with strength above a certain threshold (e.g., a threshold configured by the access node 100). The list can also be ordered according to the strengths of the signals received from the WLAN access point. If two UEs of the 11, 12, 13 report the same list of WLAN access points, they are likely located in the same region. Accordingly, an example of a grouping rule based on information about WLAN access points detected by the UEs 11, 12, 13 could be to group UEs 11, 12, 13 detecting different WLAN access points or reporting different lists of detected WLAN access points (e.g., differing in terms of included WLAN access points and/or in terms of the order of the included WLAN access points).

Having determined the group of UEs 11, 12, 13, the access node 100 sends the UL multi-grant to the UEs 11, 12, 13 of the group, and each of these UEs 11, 12, 13 will perform the LBT procedure to contend for the set of radio resources indicated by the UL multi-grant.

As mentioned above, there is a possibility that the LBT procedure succeeds for more than one of the UEs 11, 12, 13 which received the UL multi-grant. To address this possibility, the access node 100 may take measures to avoid conflicting UL radio transmissions by these UEs 11, 12, 13.

To avoid conflicting radio transmissions, the UEs 11, 12, 13 of the group may be configured to apply different backoff times in the LBT procedure. Here, the backoff time is a time period over which the UE 11, 12, 13 performs measurements on the set of radio resources indicated by the UL multi-grant to detect whether the set of radio resources is available.

Upon expiry of the back of time and if no ongoing radio transmission is detected in these measurements, i.e., if the LBT procedure is successful, the UE 11, 12, 13 may proceed to perform the UL radio transmission. Accordingly, the UE 11, 12, 13 having the shortest backoff time will transmit first, while the backoff time applied by the other UEs 11, 12, 13 still continues. These other UEs will thus detect the UL radio transmission, with the effect that their LBT procedure is not successful. Accordingly, by configuring different backoff times for the UEs 11, 12, 13, it can be ensured that the LBT procedure is successful for only one UE 11, 12, 13 of the group. A corresponding example is illustrated in FIG. 3.

Figure 3:
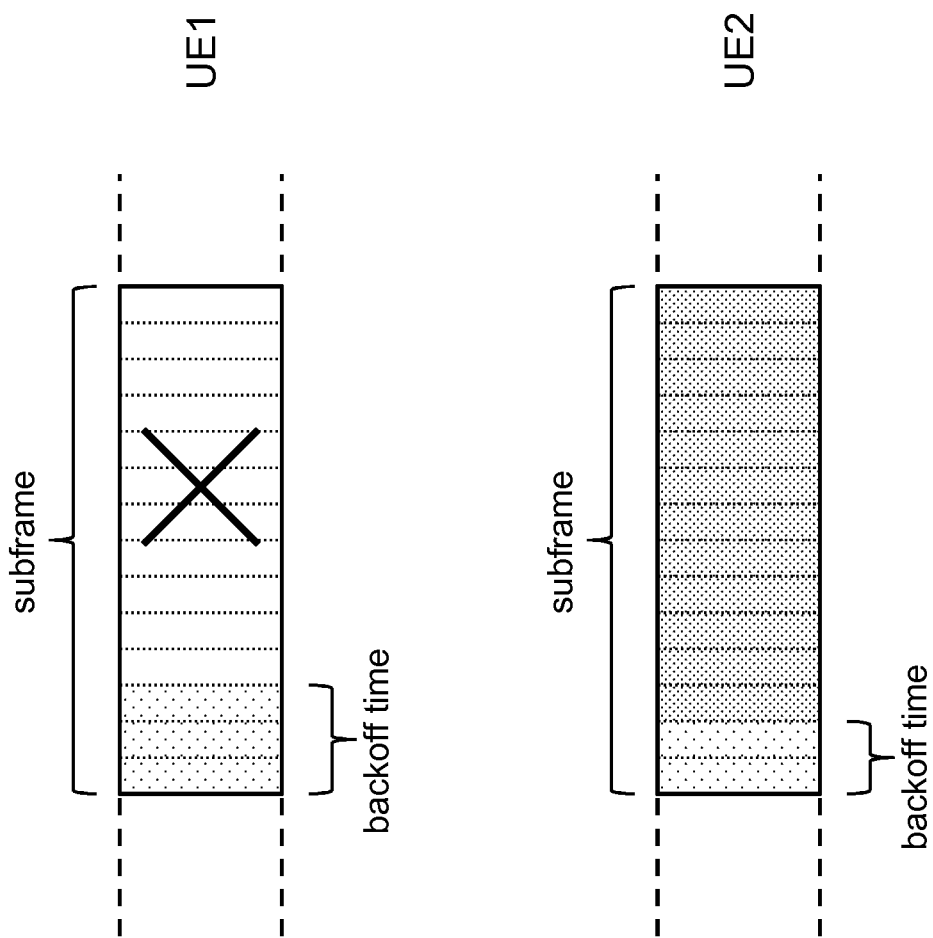
FIG. 3 schematically illustrates utilization of different backoff times according to an embodiment of the invention.

In the example of FIG. 3, a first UE of the group (UE1) is configured with a larger backoff time than a second UE of the group (UE2). In particular, the backoff time configured for the first UE extends over the first three symbols of the subframe, while the backoff time configured for the second UE extends over the first two symbols of the subframe. Upon receiving the UL multi-grant, both UEs start measuring on the set of radio resources indicated by the UL multi-grant. In the illustrated example, it is assumed that there is no other relevant transmit activity on the set of radio resources. Accordingly, upon expiry of the shorter backoff time configured for the second UE, the second UE assumes that the set of radio resources is available and starts with its UL radio transmission to the access node (in the third symbol). Since the backoff time applied by the first UE still continues, the first UE detects the transmit activity of the second UE, with the effect that the LBT procedure of the first UE is unsuccessful. Accordingly, only the second UE will perform a UL radio transmission on the set of radio resources, and conflicting radio transmissions by the first UE and the second UE are avoided.

The different backoff times may be configured by RRC (Radio Resource Control) signaling. Further, the different backoff times could also be indicated in the UL multi-grant. Various considerations may be applied for deciding which backoff times should be applied by the different UEs. For example, a UE with delay sensitive traffic could be configured with a shorter back off time than a UEs with delay tolerant traffic.

In some cases, there is a chance of conflicting radio transmissions even when using different backoff times as explained above. In particular, if in the example of FIG. 3 the first UE and the second UE are located far from each other (which may actually be a prerequisite of grouping the two UEs together), the first UE might not be able to detect the UL radio transmission by the second UE. The first UE would then assume that the set of radio resources indicated by the UL multi-grant is available and start its own UL radio transmission to the access node. The UL radio transmission from the first UE and the UL radio transmission from the second UE would then interfere at the access node. To address such scenario, the UEs of the group may further be configured to send an indication of the intended UL radio transmission, to which the access node responds with a confirmation indication. These indications may be transmitted on the set of radio resources indicated by the UL multi-grant. In this example, the UE may start with its UL radio transmission when it has received the confirmation indication. The indications transmitted by the UE and the access node offer a further possibility for other UEs to detect conflicting radio transmissions. In particular, even if in the above-mentioned example based on FIG. 3 the first UE would not detect the UL radio transmission of the second UE, it could detect the confirmation indication transmitted by the access node and possibly also the indication of the intended UL radio transmission from the second UE (which for example could be transmitted with higher power than the UL radio transmission). The indication of the intended UL radio transmission transmitted by the UE may correspond to an RTS indication. The confirmation indication transmitted by the access node may correspond to a CTS indication. A corresponding example is illustrated in FIG. 4.

Figure 4:
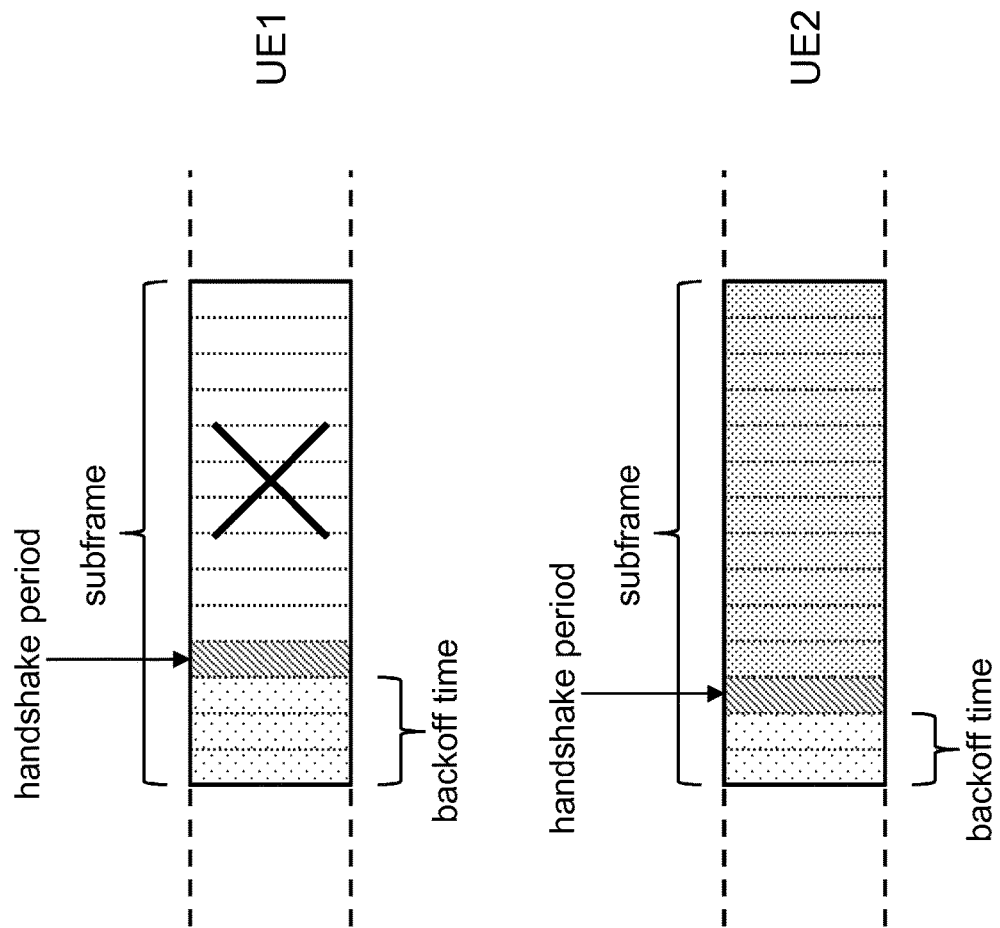
FIG. 4 schematically illustrates configuration of handshake periods according to an embodiment of the invention.

In the example of FIG. 4, a first UE of the group (UE1) is configured with a larger backoff time than a second UE of the group (UE2). In particular, the backoff time configured for the first UE extends over the first three symbols of the subframe, while the backoff time configured for the second UE extends over the first two symbols of the subframe. Immediately after the backoff time, a handshake period is configured for each of the UEs. In the illustrated example, the handshake period extends over one symbol. The handshake period is used by the UE for sending the RTS indication and receiving the CTS indication. Upon receiving the UL multi-grant, both UEs start measuring on the set of radio resources indicated by the UL multi-grant. In the illustrated example, it is assumed that there is no other relevant transmit activity on the set of radio resources. Accordingly, upon expiry of the shorter backoff time configured for the second UE, the second UE assumes that the set of radio resources is available and, in the handshake period, sends the RTS indication and receives the CTS indication from the access node. Then (in the fourth symbol) the second UE starts with its UL radio transmission to the access node. Since the backoff time applied by the first UE still continues wherein the second UE sends the RTS indication and the access node sends the CTS indication, the first UE detects the RTS indication and/or CTS indication, with the effect that the LBT procedure of the first UE is unsuccessful. Accordingly, only the second UE will perform a UL radio transmission on the set of radio resources, and conflicting radio transmissions by the first UE and the second UE are avoided.

The RTS indication and/or CTS indication can be implemented as dedicated radio messages. The messages may be compatible with RTS/CTS indications used by one or more other radio technologies which coexist in the unlicensed frequency band. For example, the RTS/CTS indication may use a similar message format, e.g., with the same preamble. Accordingly, the RTS/CTS indication could also be recognized by radio devices operating on the basis of the coexisting radio technologies, such as by the radio device 14. To implement such message format, the handshake period may need to be sufficiently long. For example, a duration of two or more symbols might be needed.

Alternatively, the RTS/CTS indication could be implemented as radio signals based on a certain sequence format which can be recognized by the radio devices and access nodes. For example, the radio signals could include a sequence derived from a Zaddoff-Chu sequence, e.g., by cyclic shifting. This may allow for a shorter handshake period, e.g., a handshake period of one symbol as illustrated in FIG. 4. Further, it could be possible to configure different sequences for different UEs, so that the UE can be identified based on the sequence. This may also help the access node to identify which UE transmits on the set of resources indicated by the UL multi-grant. Accordingly, the access node can perform decoding of radio signals received on the set of radio resources in accordance with the configuration of this specific UE. This may in particular involve that decoding of the radio signals is started after the configured backoff time and handshake period (in the example of FIG. 4, at the fourth symbol). In this way, blind decoding of radio signals in all symbols can be avoided and complexity of the required decoding processes reduced.

The transmission of the indications and/or the handshaking period applied by the UEs may be configured by RRC signaling. Further, the transmission of the indications and/or the handshaking period could also be indicated in the UL multi-grant. For example, the sending of the indications could be enabled or disabled. The decision to enable or disable the sending of the indications could for example be based on a probability of conflicting radio transmissions by the UEs of the group. This probability could be assessed based on similar information as used for forming the group, e.g., information on distances between the UEs or information on whether the UEs of the group can detect signals from each other. Accordingly, if based on this information the access node expects that the UEs of the group can detect signals from each other, the sending of the indications could be disabled. Otherwise, the sending of the indications could be enabled.

Figure 5:
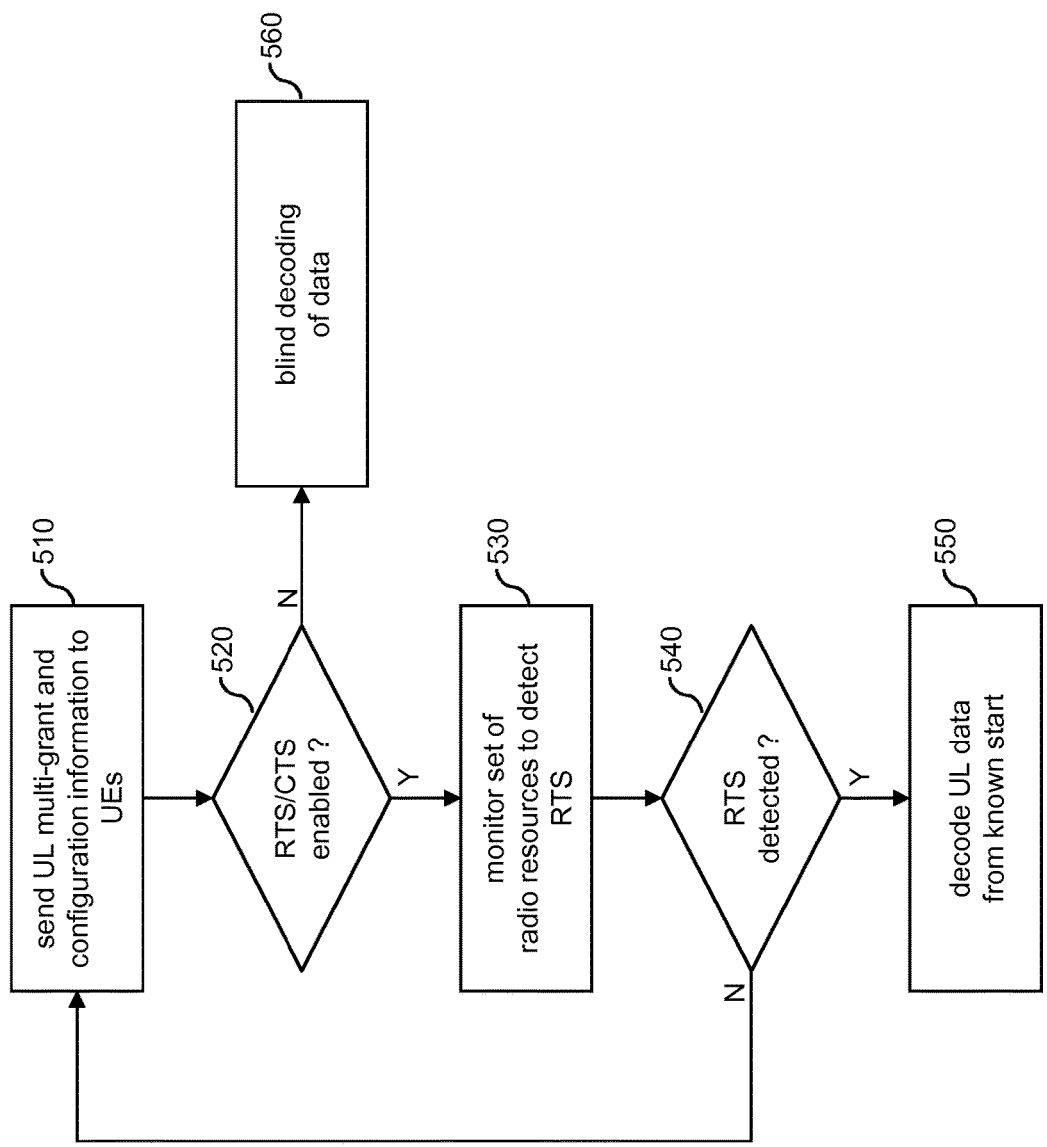
FIG. 5 shows an example of procedures performed by an access node operating according to an embodiment of the invention.

FIG. 5 illustrates an example of how the above-mentioned concepts may be implemented in processes performed by the access node, e.g., the access node 100. In the example of FIG. 5, it is assumed that the access node already identified UEs which have UL data to transmit and, from these UEs, determines the group of UEs to which the UL multi-grant is sent, e.g., using rules as explained above.

At step 510, the access node sends the UL multi-grant and configuration information to the UEs. The configuration information may be included in the UL multi-grant. Further, at least a part of the configuration information could also be transmitted separately from the UL multi-grant, e.g., by using RRC signaling. The configuration information may indicate the individual backoff times to be applied by each of the UEs in the LBT procedure. Further, the configuration information may specify whether to enable the RTS/CTS handshaking and/or indicate the position or duration of the handshaking period.

At step 520, the access node checks whether the RTS/CTS handshaking is enabled. If this is the case, the processes continue with step 530, as indicated by branch "Y". At step 530, the access node monitors the set of radio resources indicated by the UL multi-grant to detect an RTS indication from one of the UEs of the group. If specific handshaking periods are configured for the UEs, the access node may specifically monitor these handshaking periods.

If at step 540 the access node finds that an RTS indication was received from one of the UEs, the processes continue with step 550, as indicated by branch "Y". At step 550, the UL data transmitted by the UE are decoded. In the example of FIG. 5, it is assumed that the access node is able to identify the UE transmitting the UL data based on the received RTS indication. Accordingly, the decoding of the UL data can be performed in accordance with the configuration of this UE, in particular starting after the backoff time and handshaking period configured for this UE. Blind decoding of the UL data is therefore not needed at step 550.

If at step 540 the access node finds that no RTS indication was received, the access node may return to step 510 to send a new UL multi-grant (to the same group of UEs or to a different group of UEs), as indicated by branch "N". This may also involve sending new configuration information.

If at step 520 the RTS/CTS handshaking is not enabled, the processes continue with step 560, as indicated by branch "N". At step 560, the access node performs blind decoding of UL data from the set of radio resources indicated by the UL multi-grant.

Figure 6:
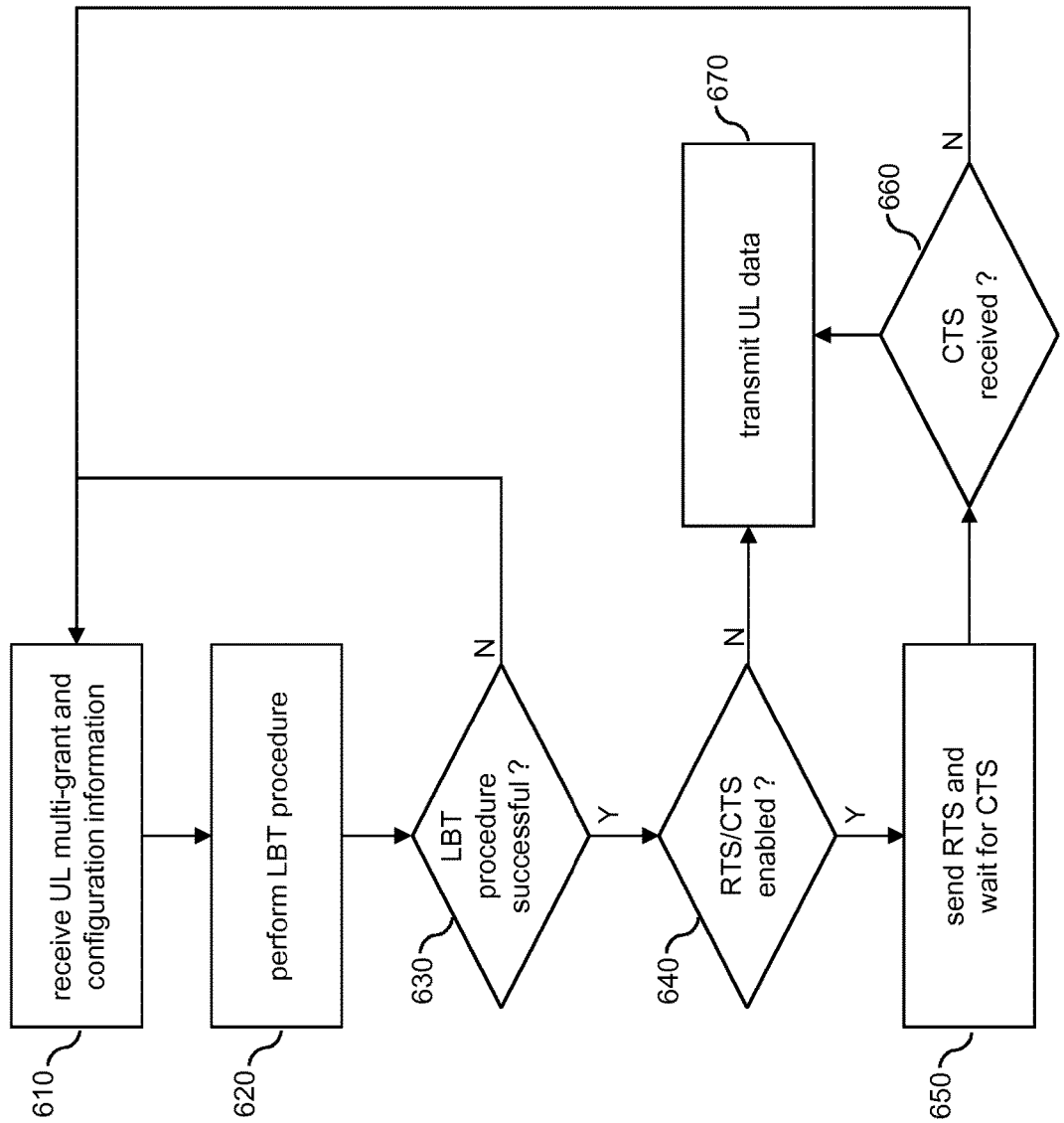
FIG. 6 shows an example of procedures performed by a UE operating according to an embodiment of the invention.

FIG. 6 illustrates an example of how the above-mentioned concepts may be implemented in processes performed by the UE, e.g., one of the UEs 11, 12, 13.

At step 610, the UE receives a UL multi-grant and configuration information from an access node of the wireless communication network, e.g., the access node 100. The UL multi-grant is transmitted to a group of UEs which have UL data to transmit using rules as explained above. This group may have been determined The configuration information may be included in the UL multi-grant. Further, at least a part of the configuration information could also be transmitted separately from the UL multi-grant, e.g., by using RRC signaling. The configuration information may indicate the individual backoff time to be applied by the UE in the LBT procedure (which differs from backoff times applied by other UEs of the group). Further, the configuration information may specify whether to enable the RTS/CTS handshaking and/or indicate the position or duration of the handshaking period for the UE. The UL multi-grant indicates a set of radio resources to be used by the UE for performing a UL transmission attempt.

At step 620, the UE starts with the UL transmission attempt by performing the LBT procedure in accordance with the received configuration information. This specifically involves monitoring the set of radio resources to detect whether the set of radio resources is available. The set of radio resources is deemed to be available if no ongoing radio transmission on the set of radio resources is detected or if for any detected ongoing radio transmission the measured signal strengths are below a threshold. Such ongoing radio transmission may also include transmission of an RTS indication by another UE or transmission of a CTS indication by the access node. If at step 630 the set of radio resources is found to be available, i.e., if the LBT procedure performed by the UE is successful, the UE continues with step 640, as indicated by branch "Y".

At step 640, the UE checks whether the RTS/CTS handshaking is enabled. If this is the case, the processes continue with step 650, as indicated by branch "Y". At step 650, the sends the RTS indication and waits for the CTS indication from the access node. This may be accomplished in accordance with corresponding configuration information received at step 610.

At step 660, the UE then checks whether the CTS indication was received from the access node. If this is the case, the processes continue with step 670, as indicated by branch "Y". At step 670, the UE transmits UL data on the set of radio resources indicated by the UL multi grant.

If at step 660 the UE finds that no CTS indication was received from the access node, the UE may return to step 610 to receive a new UL multi-grant, without transmitting UL data, as indicated by branch "N". This may also involve receiving new configuration information.

If at step 640 the RTS/CTS handshaking is not enabled, the UE directly proceeds to transmitting the UL data at step 670, as indicated by branch "N":

If at step 630 the LBT procedure is not successful, i.e., if the set of radio resources is found to be not available (e.g., due to a detected ongoing radio transmission, a detected RTS indication, or a detected CTS indication), the UE may return to step 610 to receive a new UL multi-grant, without transmitting UL data, as indicated by branch "N". This may also involve receiving new configuration information.

Figure 7:
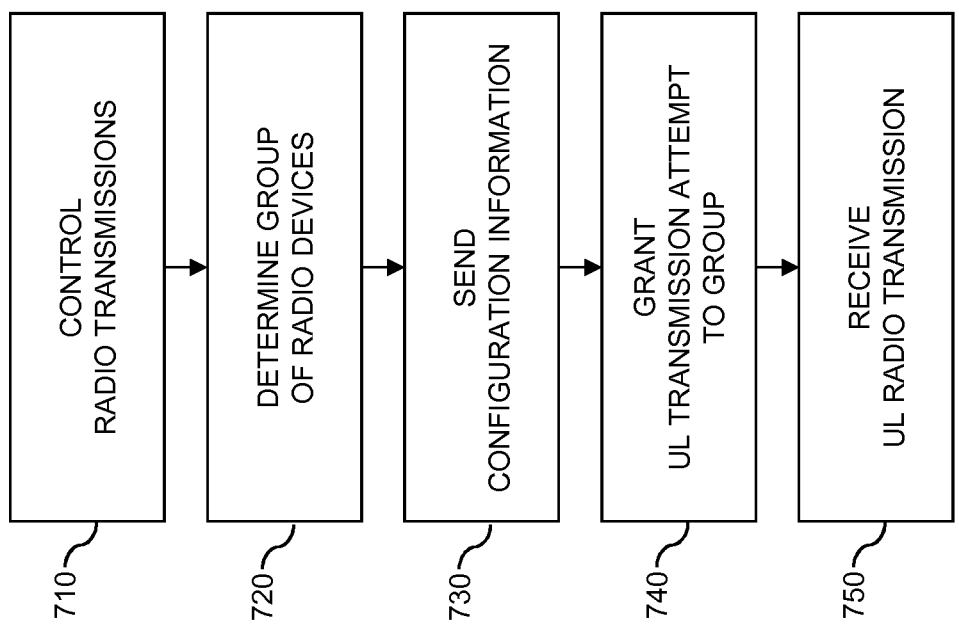
FIG. 7 shows a flowchart for schematically illustrating a method according to an embodiment of the invention.

FIG. 7 shows a flowchart for illustrating a method of controlling radio transmissions in a wireless communication network. The method of FIG. 7 may be utilized for implementing the illustrated concepts in an access node, such as the above-mentioned access node 100. If a processor-based implementation of the access node is used, the steps of the method may be performed by one or more processors of the access node. In such a case the access node may further comprise a memory in which program code for implementing the below described functionalities is stored.

At step 710, the access node of the wireless communication network controls radio transmissions on a set of radio resources. When the radio transmissions are based on a similar time-frequency grid as used in the LTE technology, the set of radio resources may correspond to resource blocks of a given subframe. The controlling of the radio transmissions may in particular involve scheduling UL radio transmissions by radio devices, e.g., by deciding which radio devices are allowed to transmit on the set of radio resources. The set of radio resources may be from an unlicensed frequency spectrum or band which is shared with other radio technologies or operators. However, it is noted that the set of radio resources could also be from a licensed frequency spectrum or band and otherwise be shared by multiple radio devices.

At step 720, the access node determines a group of multiple radio devices. The group of radio devices may for example include one or more of the above-mentioned UEs 11, 12, 13. The determination of the group may be accomplished depending on positions of the radio devices, e.g., positions obtained based on measurements performed by the access node, the radio devices, and/or by one or more further access nodes, or positions obtained from location reports from the radio devices. Alternatively or in addition, the access node may determine the group depending on radio measurements performed by the radio devices, e.g., measurements of RSS for measurements of total power (e.g., in terms of an RSSI). Alternatively or in addition, the access node may determine the group depending on beam forming configurations of the radio of the radio devices. Here, the access node may for example consider whether beamforming is applied by one or more of the radio devices. Further, the access node may also consider beamforming vectors utilized by the radio devices. If the of radio resources is shared with a WLAN technology, the access node may also determine the group depending on WLAN access points detected by the radio devices. In each case, the information used as the basis for performing the grouping enables to assess whether it can be expected that two of the radio devices experience a different interference situation on the set of radio resources.

At step 730, the access node sends configuration information to the group of radio devices. The configuration information may for example be transmitted using RRC signaling.

At step 740, the access node grants a UL transmission attempt on the set of radio resources to each radio device of the group. This may involve sending a grant to the radio devices, e.g., the above-mentioned UL multi-grant. For this purpose, the access node may use unicast transmissions addressing each radio device individually and/or a multicast transmission addressing multiple radio devices of the group. It is noted that at least a part of the configuration information of step 730 could also be received in the grant of step 740.

The UL transmission attempt is based on an LBT procedure. The LBT procedure involves that the radio device performs measurements to detect whether the set of radio resources is available and that, in response to detecting that the set of radio resources is available, the radio device performs a radio transmission to the access node on the set of radio resources.

The LBT procedure may further involve that the radio device performs measurements on the set of radio resources over a backoff time and, if on the basis of the measurements the radio device detects that the set of radio resources is available, performs the radio transmission upon expiry of the backoff time. In this case, the access node may configure the radio devices of the group to apply different backoff times, e.g., by the configuration information transmitted at step 720.

For one or more of the radio devices of the group the UL transmission attempt may also involve that, in response to detecting that the set of radio resources is available, the radio device sends an indication of the intended radio transmission (TX intent indication). This indication may correspond to the above-mentioned RTS indication. The indication may be a dedicated radio message and/or include a predefined signal sequence, e.g., a signal sequence which can be used to identify the radio device sending the indication. In response to receiving the indication of the intended radio transmission from the radio device, the access node may send an indication to confirm the intended radio transmission by the radio device (confirmation indication). This indication may correspond to the above-mentioned CTS indication. The confirmation indication may be a dedicated radio message and/or include a predefined signal sequence, e.g., a signal sequence which can be used to identify the radio device the confirmation indication relates to.

The sending of the TX intent indication may be configured by the access node, e.g., by the configuration information transmitted at step 720.

At step 750, the access node may receive a UL radio transmission from one of the radio devices of the group. This may involve blind decoding of radio signals received on the set of radio resources. In some scenarios, the access node may identify from the above-mentioned TX intent indication which radio device will perform the UL radio transmission on the set of radio resources and perform the decoding in accordance with the configuration of this radio device.

Figure 8:
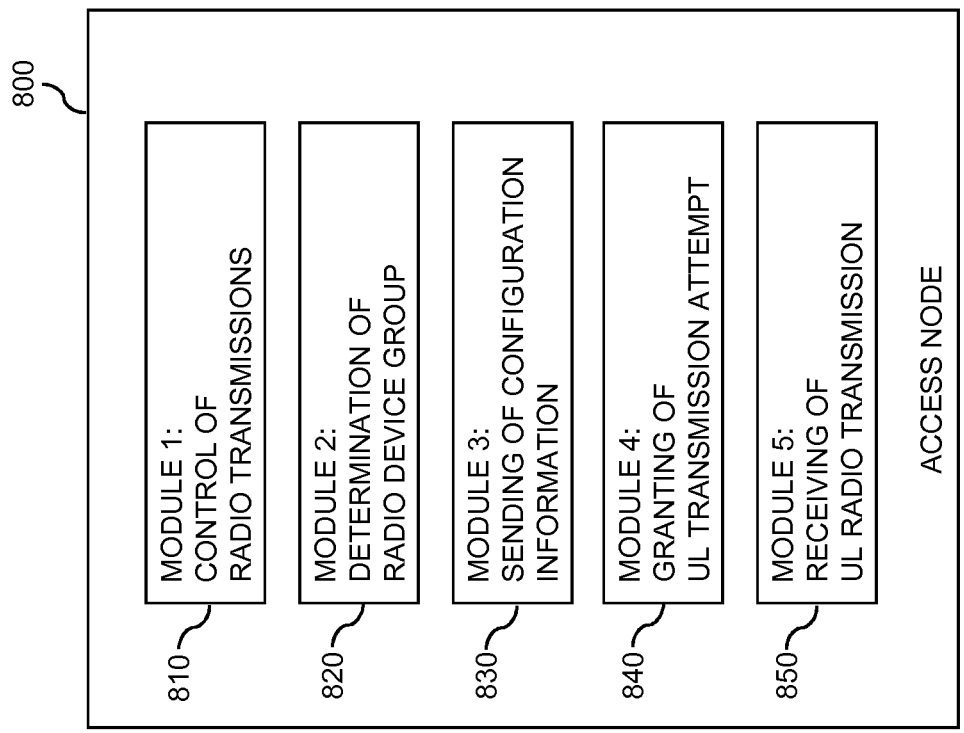
FIG. 8 shows a block diagram for illustrating functionalities of an access node according to an embodiment of the invention.

FIG. 8 shows a block diagram for illustrating functionalities of an access node 800 which operates according to the method of FIG. 7. As illustrated, the access node 800 may be provided with a module 810 configured to control radio transmissions, such as explained in connection with step 710. Further, the access node 800 may be provided with a module 820 configured to determine a group of radio devices, such as explained in connection with step 720. Further, the access node 800 may optionally be provided with a module 830 configured to send configuration information, such as explained in connection with step 730. Further, the access node 800 may be provided with a module 840 configured to grant a UL transmission attempt to each radio device of the group, such as explained in connection with step 740. Further, the access node 800 may optionally be provided with a module 850 configured to receive a UL radio transmission, such as explained in connection with step 750.

It is noted that the access node 800 may include further modules for implementing other functionalities, such as known functionalities of an eNB of the LTE technology. Further, it is noted that the modules of the access node 800 do not necessarily represent a hardware structure of the access node 800, but may also correspond to functional elements, e.g., implemented by hardware, software, or a combination thereof.

Figure 9:
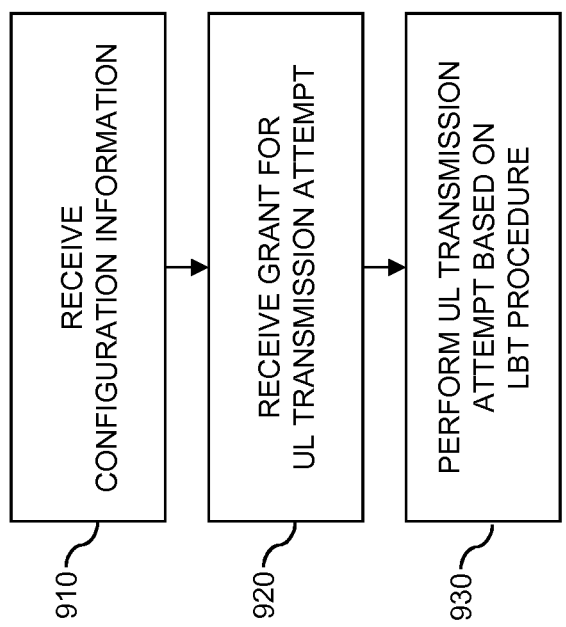
FIG. 9 shows a flowchart for schematically illustrating a further method according to an embodiment of the invention.

FIG. 9 shows a flowchart for illustrating a method of controlling radio transmissions in a wireless communication network. The method of FIG. 9 may be utilized for implementing the illustrated concepts in a radio device, such as one of the above-mentioned radio devices 11, 12, 13. If a processor-based implementation of the radio device is used, the steps of the method may be performed by one or more processors of the radio device. In such a case the radio device may further comprise a memory in which program code for implementing the below described functionalities is stored.

At step 910, the radio device receives configuration information. The configuration information may for example be received in RRC signaling.

At step 920, the radio device receives a grant for a UL transmission attempt on a set of radio resources. The grant is received from an access node of the wireless communication network, e.g., from the access node 100. The radio device is member of a group of radio devices to which the grant is sent. The grant may for example correspond to the above-mentioned UL multi-grant. It is noted that at least a part of the configuration information of step 910 could also be received in the grant of step 920.

When the radio transmissions are based on a similar time-frequency grid as used in the LTE technology, the set of radio resources may correspond to resource blocks of a given subframe. The set of radio resources may be from an unlicensed frequency spectrum or band which is shared with other radio technologies or operators. However, it is noted that the set of radio resources could also be from a licensed frequency spectrum or band and otherwise be shared by multiple radio devices.

At step 930, the radio device performs the UL transmission attempt based on an LBT procedure. The LBT procedure involves that the radio device performs measurements on the set of radio resources over a backoff time configured by the configuration information received at step 910 and. Further, the LBT procedure involves that on the basis of the measurements the radio device detects that the set of radio resources is available, and performs the radio transmission upon expiry of the backoff time. The backoff time configured by the received configuration information differs from a backoff time configured to be applied by the other radio devices of the group.

The UL transmission attempt may also involve that, in response to detecting that the set of radio resources is available, the radio device sends an indication of the intended radio transmission (TX intent indication). This indication may correspond to the above-mentioned RTS indication. The indication may be a dedicated radio message and/or include a predefined signal sequence, e.g., a signal sequence which can be used to identify the radio device sending the indication. In response to sending the indication of the intended radio transmission, the radio device may receive an indication to confirm the intended radio transmission (confirmation indication). This indication may be received from the access node which sent the grant of step 920 and may correspond to the above-mentioned CTS indication. The confirmation indication may be a dedicated radio message and/or include a predefined signal sequence, e.g., a signal sequence which can be used to identify the radio device the confirmation indication relates to.

The sending of the TX intent indication and/or the receiving of the confirmation indication may be by the configuration information transmitted at step 910. In other words, the configuration information may further indicate a configuration for the sending of the indication of the intended radio transmission and/or a configuration for the receiving of the indication to confirm the intended radio transmission.

Figure 10:
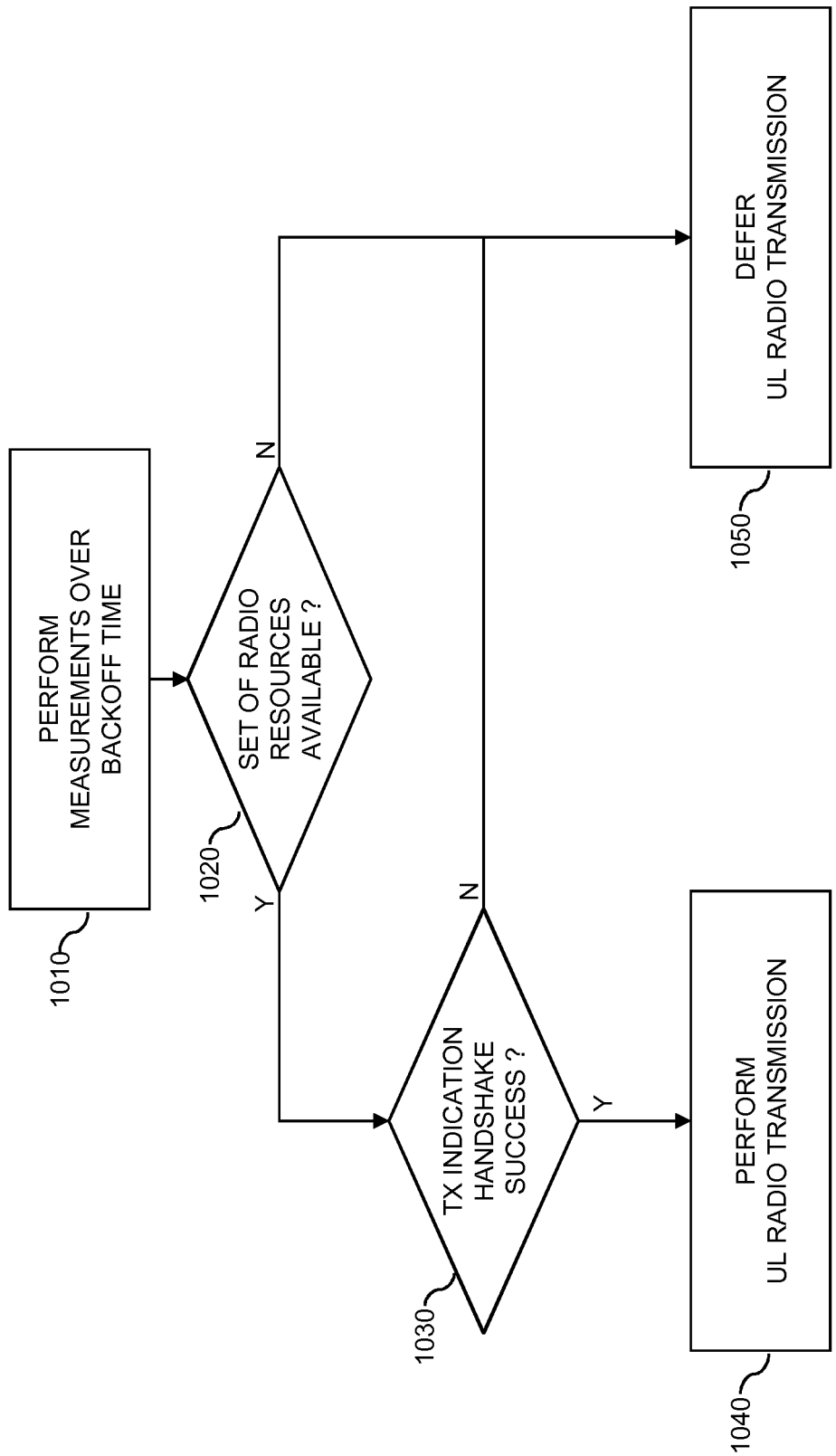
FIG. 10 shows a flowchart for schematically illustrating an LBT based UL transmission attempt according to an embodiment of the invention.

FIG. 10 shows a flowchart for further illustrating a method for implementing the UL transmission attempt in the methods of FIGS. 7 and 9.

At step 1010, the radio device performs measurements on the set of radio resources indicated by the received grant. The measurements may be performed over a backoff time differing from backoff times configured to be applied by other radio devices of the group. The radio device uses the measurements of step 1010 to determine whether the set of radio resources is available, as indicated by step 1020. The set of radio resources may be deemed as being available if the radio device detects no ongoing radio transmission on the set of radio resources or if measured signal strengths of any detected ongoing radio transmission are below a threshold.

If the set of radio resources is found to be available at step 1020, the radio device may proceed to step 1030, as indicated by branch "Y". At step 1030, the radio device may check success of an optional TX intent indication handshake. The TX intent indication handshake involves the sending of the above-mentioned TX intent indication and reception of the above-mentioned confirmation indication. If the confirmation indication is received in response to the TX intent indication, the TX intent indication handshake is deemed to be successful.

At step 1030 the TX intent indication handshake is found to be successful, as indicated by branch "Y", the radio device may proceed to step 1040 and perform the UL radio transmission on the set of radio resources indicated by the received grant.

If at step 1030 the TX intent indication handshake is found to be not successful, the radio device may proceed to step 1050, as indicated by branch "N". At step 1050, the radio device differs the UL radio transmission. For example, UL data to be transmitted by the radio device may then be sent in a later UL radio transmission, e.g., after receiving a further grant.

Figure 11:
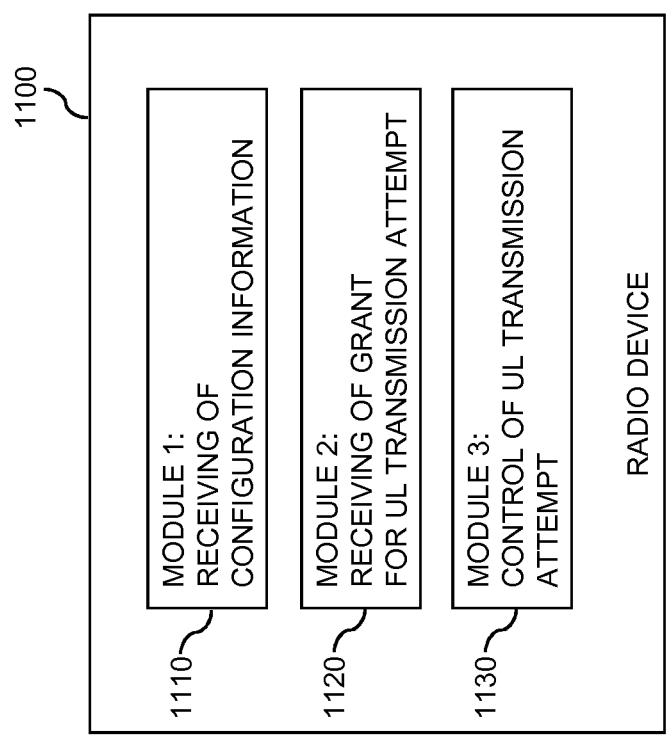
FIG. 11 shows a block diagram for illustrating functionalities of a radio device according to an embodiment of the invention.

FIG. 11 shows a block diagram for illustrating functionalities of radio device 1100 which operates according to the method of FIG. 9. As illustrated, the radio device 1100 may be provided with a module 1110 configured to receive control information, such as explained in connection with step 910. Further, the radio device 1100 may be provided with a module 1120 configured to receive a grant for a UL transmission attempt, such as explained in connection with step 920. Further, the radio device 1100 may be provided with a module 1130 configured to control a UL transmission attempt, such as explained in connection with step 930 and steps 1010, 1020, 1030, 1040, and 1050 of FIG. 10.

It is noted that the radio device 1100 may include further modules for implementing other functionalities, such as known functionalities of a UE supporting the LTE technology. Further, it is noted that the modules of the radio device 1100 do not necessarily represent a hardware structure of the radio device 1100, but may also correspond to functional elements, e.g., implemented by hardware, software, or a combination thereof.

It is to be understood that the method of FIG. 7 and the methods of FIGS. 9 and 10 may also be combined in a system including at least one access node operating according the method of FIG. 7 and multiple radio devices operating according to the methods of FIGS. 9 and 10.

Figure 12:
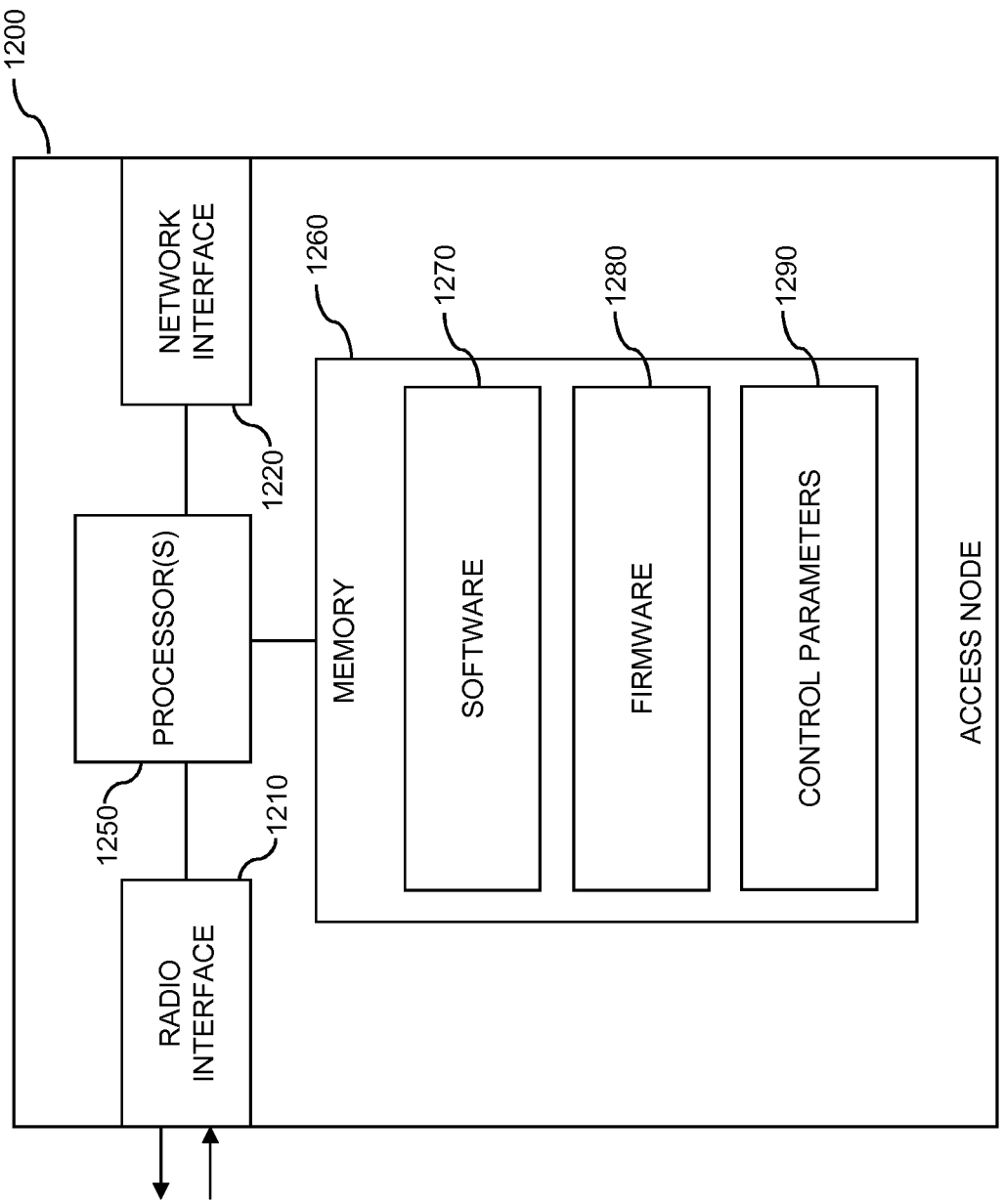
FIG. 12 schematically illustrates structures of an access node according to an embodiment of the invention.

FIG. 12 illustrates a processor-based implementation of an access node 1200 which may be used for implementing the above described concepts. For example, the structures as illustrated in FIG. 12 may be used for implementing the above-mentioned access node 100. The access node 1200 may correspond to a base station, such as an eNB of the LTE technology. However, the access node 1200 could alternatively or in addition also support other kinds of wireless communication technologies.

As illustrated, the access node 1200 may include a radio interface 1210 for communicating with radio devices, such as the above-mentioned UEs 11, 12, 13. For example, the radio interface 1210 may be used for receiving UL radio transmissions from the radio devices. Further, the radio interface 1210 may be used for sending DL radio transmissions to the radio devices. The radio interface 1210 may for example implement the Uu interface of the LTE technology. As further illustrated, the access node 1200 may include a network interface 1220 for communicating with other network nodes. The network interface 1220 may for example implement a backhaul interface of the access node 1200.

Further, the access node 1200 may include one or more processors 1250 coupled to the interfaces 1210, 1220 and a memory 1260 coupled to the processor(s) 1250. By way of example, the interfaces 1210, 1220 the processor(s) 1250, and the memory 1260 could be coupled by one or more internal bus systems of the access node 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270, firmware 1280, and/or control parameters 1290. The memory 1260 may include suitably configured program code to be executed by the processor(s) 1250 so as to implement the above-described functionalities of an access node, such as explained in connection with FIG. 7.

It is to be understood that the structures as illustrated in FIG. 12 are merely schematic and that the access node 1200 may actually include further components which, for the sake of clarity, have not been illustrated, e.g., further interfaces or processors. Also, it is to be understood that the memory 1260 may include further program code for implementing known functionalities of an access node, e.g., known functionalities of an eNB of the LTE technology. According to some embodiments, also a computer program may be provided for implementing functionalities of the access node 1200, e.g., in the form of a physical medium storing the program code and/or other data to be stored in the memory 1260 or by making the program code available for download or by streaming.

Figure 13:
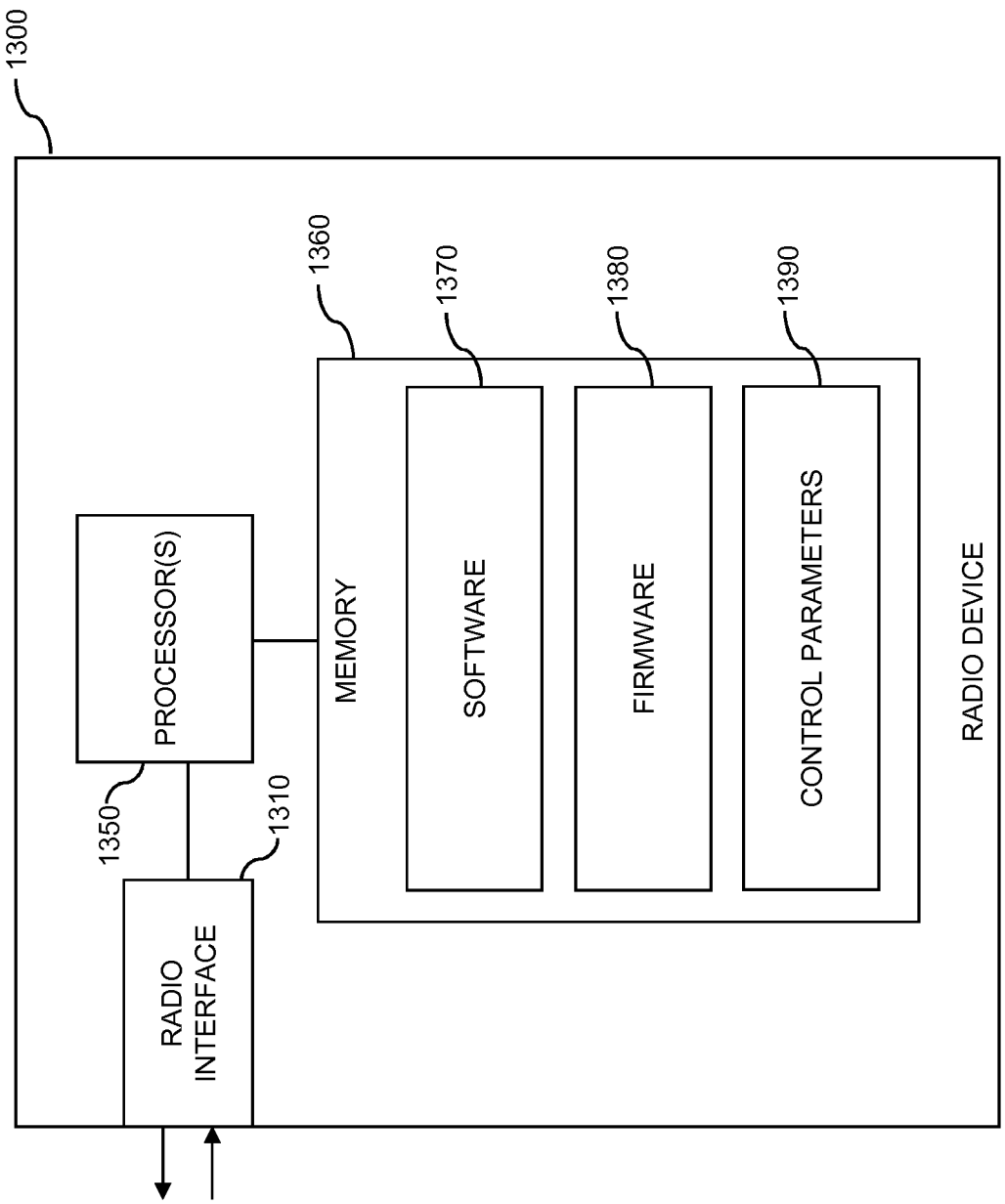
FIG. 13 schematically illustrates structures of a radio device according to an embodiment of the invention.

FIG. 13 illustrates a processor-based implementation of a radio device 1300 which may be used for implementing the above described concepts. The radio device 1300 may correspond to a UE, such as a UE supporting the LTE technology. However, the radio device 1300 could alternatively or in addition also support other kinds of wireless communication technologies. For example, the structures as illustrated in FIG. 13 may for example be used for implementing one of the above-mentioned UEs 11, 12, 13.

As illustrated, the radio device 1300 may include a radio interface 1310 for communicating with the wireless communication network, in particular with an access node of the wireless communication network, such as the above-mentioned access node 100. For example, the radio interface 1310 may be used for sending UL radio transmissions to the access node. Further, the radio interface 1310 may be used for receiving DL radio transmissions from the access node. The radio interface 1310 may for example implement the Uu interface of the LTE technology.

Further, the radio device 1300 may include one or more processors 1350 coupled to the radio interface 1310 and a memory 1360 coupled to the processor(s) 1350. By way of example, the radio interface 1310 the processor(s) 1350, and the memory 1360 could be coupled by one or more internal bus systems of the radio device 1300. The memory 1360 may include a ROM, e.g., a flash ROM, a RAM, e.g., a DRAM or SRAM, a mass storage, e.g., a hard disk or solid state disk, or the like. As illustrated, the memory 1360 may include software 1370, firmware 1380, and/or control parameters 1390. The memory 1360 may include suitably configured program code to be executed by the processor(s) 1350 so as to implement the above-described functionalities of a radio device, such as explained in connection with FIGS. 9 and 10.

It is to be understood that the structures as illustrated in FIG. 13 are merely schematic and that the radio device 1300 may actually include further components which, for the sake of clarity, have not been illustrated, e.g., further interfaces or processors. Also, it is to be understood that the memory 1360 may include further program code for implementing known functionalities of a radio device, e.g., known functionalities of a UE supporting the LTE technology. According to some embodiments, also a computer program may be provided for implementing functionalities of the radio device 1300, e.g., in the form of a physical medium storing the program code and/or other data to be stored in the memory 1360 or by making the program code available for download or by streaming.

As can be seen, the concepts as described above may be used for efficiently controlling radio transmissions on radio resources shared by multiple radio devices, operators or radio technologies. For example, it can be avoided that scheduling of radio transmissions from the network side adversely affects the chances of successfully contending for shared radio resources. Further, conflicting radio transmissions on shared radio resources can be avoided in an efficient manner.

It is to be understood that the examples and embodiments as explained above are merely illustrative and susceptible to various modifications. For example, the illustrated concepts may be applied in connection with various kinds of wireless communication technologies, without limitation to the above-mentioned example of the LTE technology or LTE LAA technology. Moreover, the set of radio resources controlled by the UL multi grant may be organized in various ways, without limitation to a time-frequency grid as used in the LTE technology. For example, the concepts could also be applied with respect to time-based scheduling of radio transmissions on a single frequency. Further, the illustrated concepts may be applied with respect to unlicensed frequency bands with respect to unlicensed frequency bands. For example, in the LTE technology multiple UEs could send a scheduling request on the same radio resources, and the eNB could react to such scheduling requests by sending the above-mentioned UL multi grant indicating a set of radio resources in the licensed LTE frequency band. The above-mentioned configuration of different backoff times and/or of the RTS/CTS handshake could then be used for resolving conflicts on the radio resources indicated by the UL multi grant. Further, the illustrated concepts may be applied in various kinds of radio devices, including mobile phones, portable computing devices, machine type of communication devices. Moreover, it is to be understood that the above concepts may be implemented by using correspondingly designed software to be executed by one or more processors of an existing device, or by using dedicated device hardware. Further, it should be noted that the illustrated nodes or devices may each be implemented as a single device or as a system of multiple interacting devices.

The invention claimed is:

1. A method, by a radio device of a group of multiple radio devices, of controlling radio transmission in a wireless communication network, the method comprising:
receiving, from an access node of the wireless communication network, a grant for an uplink transmission attempt on a set of radio resources and configuration information for the uplink transmission attempt; and
performing the uplink transmission attempt based on a listen-before talk procedure, wherein the listen-before talk procedure comprises:
over a backoff time configured by the received configuration information, performing measurements on the set of radio resources,
on the basis of the measurements, detecting that the set of radio resources is available, and
upon expiry of the backoff time, performing a radio transmission to the access node on the set of radio resources,
wherein the backoff time configured by the received configuration information differs from a backoff time configured to be applied by other radio devices of the group.

2. An access node for a wireless communication network, the access node comprising:
processing circuitry; and
a memory storing program code, wherein execution of the program code by the processing circuitry causes the access node to:
control radio transmissions on a set of radio resources;
determine a group of multiple radio devices; and
grant an uplink transmission attempt on the set of radio resources to each radio device of the group, wherein the uplink transmission attempt is based on a listen-before-talk procedure in which the radio device performs measurements to detect whether the set of radio resources is available and the radio device performs the radio transmission in response to detecting that the set of radio resources is available;
wherein the listen-before talk procedure further comprises that:
over a backoff time, the radio device performs measurements on the set of radio resources,
on the basis of the measurements, the radio device detects that the set of radio resources is available, and
upon expiry of the backoff time, the radio device performs the radio transmission, and
wherein the access node configures the radio devices of the group to apply different backoff times.

3. An access node for a wireless communication network, the access node comprising:
processing circuitry; and
a memory storing program code, wherein execution of the program code by the processing circuitry causes the access node to:
control radio transmissions on a set of radio resources;
determine a group of multiple radio devices; and
grant an uplink transmission attempt on the set of radio resources to each radio device of the group, wherein the uplink transmission attempt is based on a listen-before-talk procedure in which the radio device performs measurements to detect whether the set of radio resources is available and the radio device performs the radio transmission in response to detecting that the set of radio resources is available;

wherein the set of radio resources is shared with a Wireless Local Area Network technology, and wherein the access node is configured to determine the group depending on Wireless Local Area Network access points detected by the radio devices.

4. A radio device, comprising:

processing circuitry; and a memory storing program code, wherein execution of the program code by the processing circuitry causes the radio device to:

receive, from an access node of a wireless communication network and together with other radio devices of a group, a grant for an uplink transmission attempt on a set of radio resources and configuration information for the uplink transmission attempt; and perform the uplink transmission attempt based on a listen-before talk procedure, wherein the listen-before talk procedure comprises:

performing measurements on the set of radio resources over a backoff time configured by the received configuration information, on the basis of the measurements, detecting that the set of radio resources is available, and upon expiry of the backoff time, performing a radio transmission to the access node on the set of radio resources, wherein the backoff time configured by the received configuration information differs from a backoff time configured to be applied by other radio devices of the group.

5. The radio device according to claim 4, wherein the uplink transmission attempt performed by the radio device further comprises, in response to detecting that the set of radio resources is available, sending an indication of the intended radio transmission.

6. The radio device according to claim 5, wherein the configuration information further indicates a configuration for the sending of the indication of the intended radio transmission.

7. The radio device according to claim 5, wherein the uplink transmission attempt performed by the radio device further comprises, in response to the indication of the intended radio transmission, receiving an indication to confirm the intended radio transmission.

8. The radio device according to claim 7, wherein the configuration information further indicates a configuration for the receiving of the indication to confirm the intended radio transmission.

9. The radio device according to claim 4, wherein the set of radio resources is shared with a Wireless Local Area Network technology.

10. The radio device according to claim 4, wherein the set of radio resources is from an unlicensed frequency spectrum.

* * * * *